US008826172B2

(12) United States Patent
Brinda

(10) Patent No.: US 8,826,172 B2
(45) Date of Patent: Sep. 2, 2014

(54) METHOD FOR UNLOCKING SCREEN-LOCKED STATE OF TOUCH SCREEN, ELECTRONIC DEVICE AND RECORDING MEDIUM USING THE SAME

(75) Inventor: David Brinda, Bellevue, WA (US)

(73) Assignee: HTC Corporation, Taoyuan County (TW)

( * ) Notice: Subject to any disclaimer, the term of this patent is extended or adjusted under 35 U.S.C. 154(b) by 809 days.

(21) Appl. No.: 12/542,710

(22) Filed: Aug. 18, 2009

(65) Prior Publication Data

US 2010/0306693 A1 Dec. 2, 2010

(30) Foreign Application Priority Data

May 27, 2009 (TW) .................................. 98117942 A

(51) Int. Cl.
*G06F 3/048* (2013.01)
*G06F 3/041* (2006.01)
*G06F 3/0488* (2013.01)
(52) U.S. Cl.
CPC .................................. *G06F 3/0488* (2013.01)
USPC ......................................................... 715/784
(58) Field of Classification Search
USPC .......................................................... 715/784
See application file for complete search history.

(56) References Cited

U.S. PATENT DOCUMENTS

| 8,127,254 | B2* | 2/2012 | Lindberg et al. ............ | 715/863 |
| 2007/0150842 | A1* | 6/2007 | Chaudhri et al. ............ | 715/863 |
| 2009/0006991 | A1 | 1/2009 | Lindberg et al. | |
| 2009/0094562 | A1* | 4/2009 | Jeong et al. .................. | 715/863 |
| 2010/0248689 | A1* | 9/2010 | Teng et al. ................... | 455/411 |

FOREIGN PATENT DOCUMENTS

| CN | 101393511 | 3/2009 |
| EP | 1022650 | 7/2000 |
| TW | 200805990 | 1/2008 |

OTHER PUBLICATIONS

"Search Report of European Counterpart Application" issued on Nov. 27, 2009, p. 1-p. 3.
"1st Office Action of European Counterpart Application" issued on Dec. 14, 2009, p. 1-p. 4.
"2nd Office Action of European Counterpart Application" issued on Jul. 20, 2010, p. 1-p. 5.
"First Office Action of China Counterpart Application", issued on Jun. 9, 2011, p.1-p.5.
"Office Action of Taiwan Counterpart Application", issued on Jan. 17, 2013, p. 1-p. 7.

* cited by examiner

*Primary Examiner* — Peiyong Weng
(74) *Attorney, Agent, or Firm* — Jianq Chyun IP Office

(57) ABSTRACT

A method for unlocking a screen-locked state of a touch screen, and an electronic device and a recording medium using the same are disclosed. In the present method, during a screen-locked state, an unlocking area of a touch screen of the mobile device is divided into a first touch area and a second touch area by a separate line. Next, the touch screen is used to detect a touch operation of a user. If it is determined that the touch operation is started from the first touch area and ended in the second touch area, the screen of the mobile device is to be unlocked.

16 Claims, 7 Drawing Sheets

METHOD FOR UNLOCKING SCREEN-LOCKED STATE OF TOUCH SCREEN, ELECTRONIC DEVICE AND RECORDING MEDIUM USING THE SAME

CROSS-REFERENCE TO RELATED APPLICATION

This application claims the priority benefit of Taiwan application serial No. 98117942, filed on May 27, 2009. The entirety of the above-mentioned patent application is hereby incorporated by reference herein and made a part of this specification.

BACKGROUND OF THE APPLICATION

1. Field of the Application

The present application relates to a method for operating a touch screen. More particularly, the present application relates to a method for unlocking a screen-locked state of a touch screen.

2. Description of Related Art

To get larger screen size, more and more electronic devices, such as mobile phones, are equipped with touch screen recently. However, the touch screen is quite sensitive to an external touch operation. When the user carelessly touches an on-screen key displayed on the touch screen, the electronic device is forced to execute a function corresponding to the on-screen key. Therefore, the electronic device has a screen-locked state to prevent the user from miss-touching the touch screen.

SUMMARY OF THE APPLICATION

The present application is directed to a method for unlocking a screen-locked state of a touch screen, an electronic device and a recording medium using the same, by which whether the screen of the electronic device is unlocked is determined according to whether a user's touch operation on a touch screen crosses a separate line.

The present application provides a method for unlocking a screen-locked state of a touch screen, wherein the touch screen in the screen-locked state has an unlocking area. In the method, the unlocking area of the touch screen is divided into a first touch area and a second touch area by a separate line. While a touch operation is detected by the touch screen, the screen-locked state of the touch screen is to be unlocked when the touch operation is started from the first touch area and ended in the second touch area.

The present application provides an electronic device including a touch screen and a processing module. The touch screen is used for detecting a touch operation, wherein touch screen in a screen-locked state has an unlocking area, and the unlocking area is divided into a first touch area and a second touch area by a separate line. The processing module is coupled to the touch screen, and is used for unlocking the screen-locked state of the touch screen when determining that the touch operation is started from the first touch area and ended in the second touch area.

The present application further provides a recording medium for storing a computer program, which is used to execute the aforementioned method. Basically, the computer program is assembled by a plurality of program sections (i.e. an organization diagram building program section, a list approving program section, a setting program section, and a deploying program section). Moreover, after the plurality of program sections are loaded to the electronic device and executed, the steps of the method for unlocking the screen-locked state of the touch screen can be accomplished.

The present application provides an electronic device including a dividing means, a detecting means and an unlocking means. The dividing means is for dividing an unlocking area of a touch screen of the electronic device into a first touch area and a second touch area by a separate line. The detecting means is for detecting a touch operation with the touch screen. And the unlocking means is for unlocking a screen-locked state of the touch screen when determining that the touch operation is started from the first touch area and ended in the second touch area.

According to the examples of the present application, when the touch screen enters the screen-locked state, the original layer originally displayed on the touch screen is covered by the protection layer, and the touch operation of the user will be detected. If the detected touch operation crosses the separate line, the protection layer is removed, so as to unlock the screen-locked state of the touch screen.

In order to make the aforementioned and other features and advantages of the present application comprehensible, several exemplary examples accompanied with figures are described in detail below.

DESCRIPTION

In the present application, a touch screen in a screen-locked state has an unlocking area, and the unlocking area is divided into two independent areas by a separate line. Then, whether the screen-locked state is unlocked is determined according to a touch operation detected with the touch screen from a user in the two areas. The present application applies a dual-layer display concept to implement the screen locking. According to such concept, in a normal state, an original layer is displayed for being operated by the user; and in the screen-locked state, a protection layer is displayed to cover the original layer preventing the user from miss-touching function icons or keys displayed on the original layer.

Moreover, the protection layer is correspondingly moved or removed according to the touch operation on the protection layer. When detecting a touch operation moved on the touch screen, the electronic device moves the protection layer according to a direction and a displacement of the touch operation, so that the original layer located under the protection layer can be viewed by the user. When detecting the touch operation ended, the electronic device determines whether to remove the protection layer and unlock the screen-locked state according to the start and end positions of the touch operation on the touch screen, so that the function icons or keys displayed on the original layer can be operated by the user. Examples are provided below to describe the above circumstances in detail.

Figure 1:
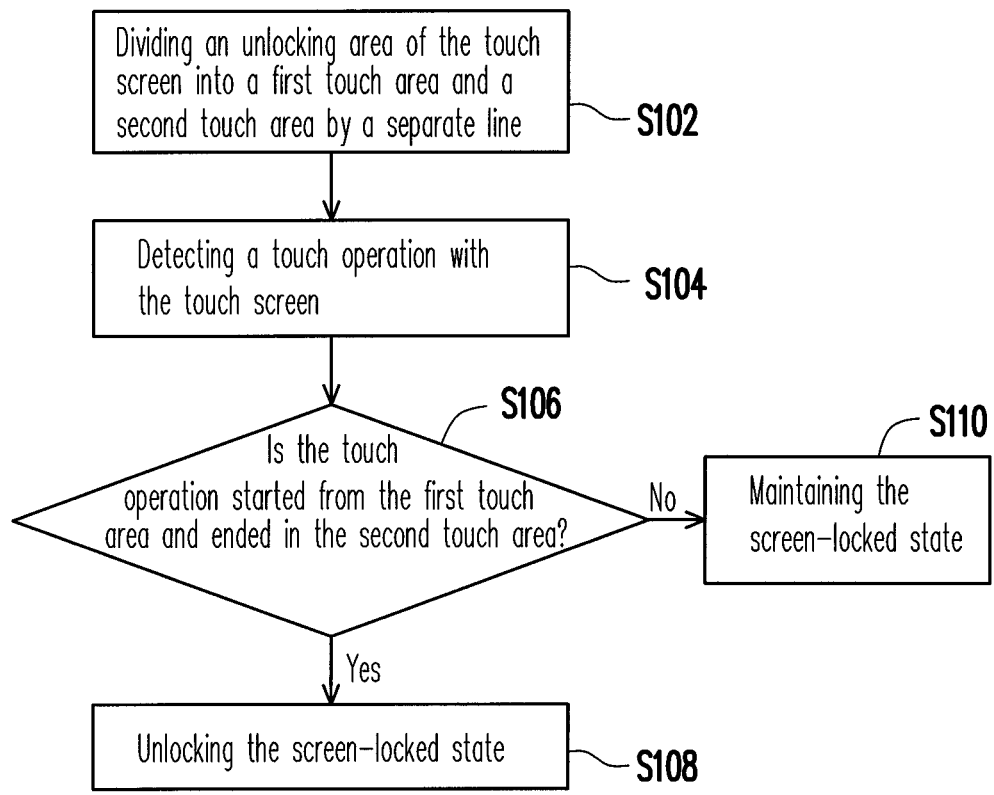
FIG. 1 is a flowchart illustrating a method for unlocking a screen-locked state of a touch screen according to an example of the present application.

FIG. 1 is a flowchart illustrating a method for unlocking a screen-locked state of a touch screen according to an example of the present application. The method of the present example is adapted to an electronic device with a touch screen, for example, a mobile phone, a personal digital assistant (PDA), a PDA mobile phone, a lap top computer, a car computer, a digital camera, a music player, a game device or any other electronic device with a touch screen. The method in FIG. 1 is described as follows.

When the touch screen is in the screen-locked state, whether the screen-locked state is unlocked is determined according to the touch operation of the user. Wherein, the touch screen enters the screen-locked state when the user's operation is not detected for a period of time, or directly enters the screen-locked state when receiving an input from a user to lock the touch screen, which is not limited by the present application.

After the touch screen enters the screen-locked state, the touch screen has an unlocking area and the unlocking area is divided into a first touch area and a second touch area by a separate line (S102). The unlocking area may include the whole touch area of the touch screen, or may include a part of touch area of the touch screen. The separate line may be a straight line or a curve line, and the separate line may be displayed or not displayed on the touch screen. All above modifications fall within the scope of the present application.

It should be noticed that even if the touch screen has entered the screen-locked state, the touch screen of the electronic device is still capable of detecting a touch operation from the user (S104).

When the touch screen detects a touch operation, the electronic device determines whether the touch operation is started from the first touch area and ended in the second touch area (S105). If the touch operation is started from the first touch area and ended in the second touch area (i.e., crosses the separate line), the screen-locked state of the touch screen is to be unlocked (S108). Otherwise, the touch screen maintains the screen-locked state (S110). In brief, when the user first touches the first touch area, drags across the separate line, and leaves in the second touch area finally, the electronic device determines the above touch operation is effective to unlock the screen-locked state of the touch screen for allowing the user to operate the function icons or keys displayed on the touch screen the electronic device.

In another example, the above operation method may be further combined with the dual-layer display concept to increase an operation flexibility of the electronic device. Another example is provided below for further description.

Figure 2:
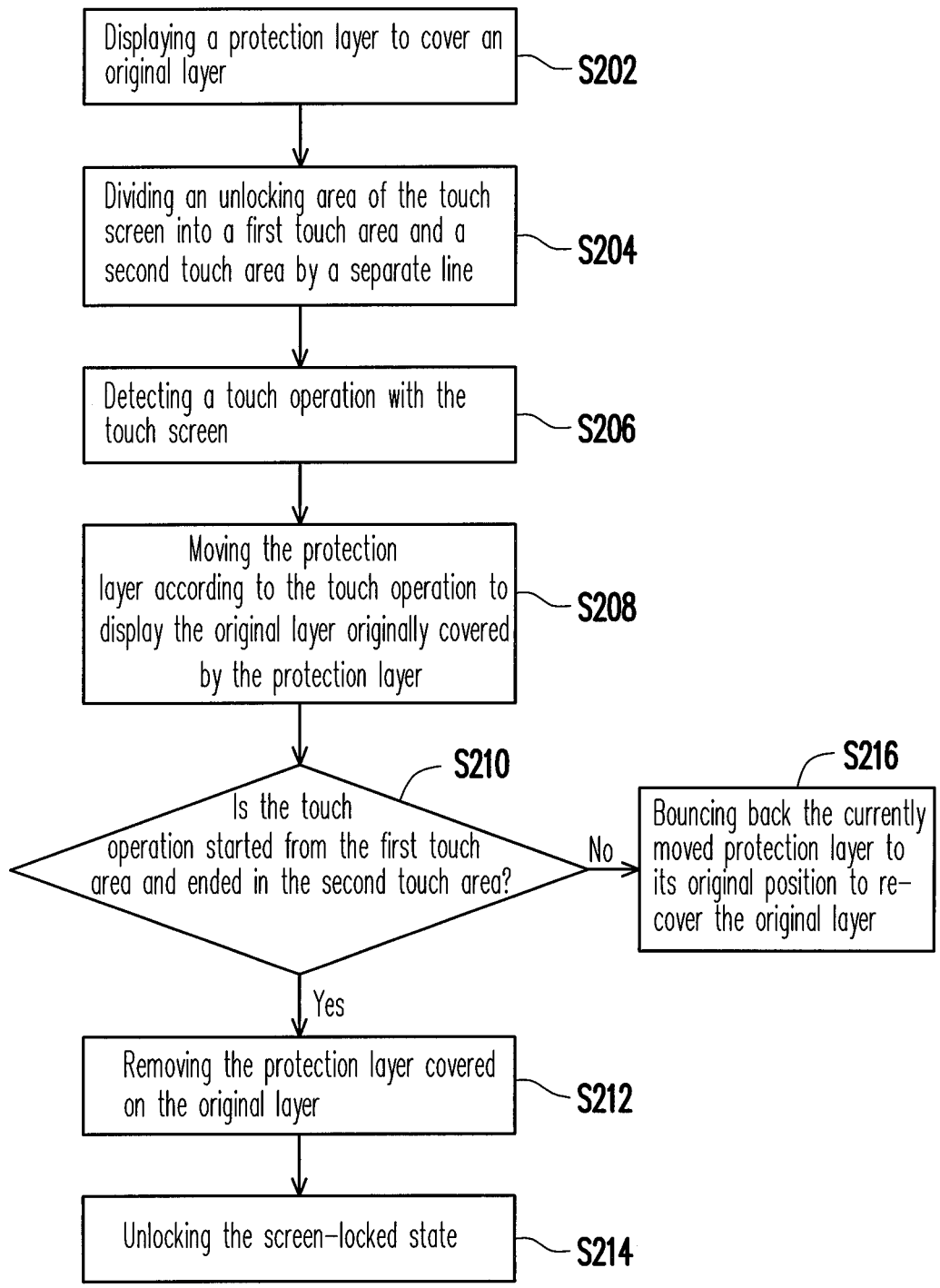
FIG. 2 is a flowchart illustrating a method for unlocking a screen-locked state of a touch screen according to another example of the present application.

FIG. 2 is a flowchart illustrating a method for unlocking the screen-locked state of the touch screen according to another example of the present application. The method of the present example is also adapted to an electronic device with a touch screen, for example, a mobile phone, a PDA, a PDA mobile phone, a lap top computer, a car computer, a digital camera, a music player, a game device or any other electronic device with a touch screen. The method in FIG. 2 is described as follows.

When the touch screen is in the screen-locked state, a protection layer is displayed on the touch screen to cover an original layer originally displayed on the touch screen in a normal state (S202), so as to avoid the user from miss-touching the function icons an keys displayed on the original layer. The original layer may be a main menu user interface, an address book user interface, a network-browsing user interface, a message editing user interface, a multimedia-playing user interface or any types of user interface of the electronic device. The protection layer may cover the whole original layer, or may cover only a part of the original layer depending on design requirements. In addition, on the protection layer the information such as time, date, a service provider, an incoming or untreated event (e.g., an incoming call, message, email, a missed call, an unread voicemail, an unread message and/or an unread E-mail) may be displayed, so that the user can know a current state of the electronic device.

Besides displaying the protection layer, when the touch screen is in the screen-locked state, the touch screen has an unlocking area and the unlocking area of is divided into a first touch area and a second touch area by a separate line (S204). Since the step S204 of the present example is similar to the step S102 of the aforementioned example, the detailed descriptions thereof are not repeated.

Next, the touch screen is used to detect the touch operation performed on the protection layer by the user (S206). During a process of detecting the touch operation, the protection layer may be moved according to a moving direction and a displacement of the touch operation, so as to reveal the original layer covered by the protection layer (S208) for allowing the user to view the content displayed on the original layer.

In one example, whether the protection layer is moved is determined according to the displacement of the touch operation along a specific direction. If the displacement along the specific direction is greater than a predetermined value, the protection layer is moved along the specific direction. Moreover, a moving distance of the protection layer may be determined according to the displacement of the touch operation along the specific direction.

For example, the specific direction is set to be a downward direction, and the predetermined value is set to be zero. When the touch screen detects a touch operation with a downward displacement, the protection layer is correspondingly moved downwards, and the moving distance of the protection layer increases as the displacement of the downward touch operation increases. In practice, the moving distance of the protection layer may be or not proportional to the downward displacement of the touch operation. It should be noticed that during an actual operation, a direction of the touch operation performed by the user may be slightly deviated from the specific direction. However, whether the protection layer is moved and the moving distance thereof may still be determined by calculating the displacement along the specific direction of the touch operation (for example, the downward direction), so that an effect of moving the protection layer is also achieved.

While the protection layer is being moved, the electronic device further determines whether the touch operation is started from the first touch area and ended in the second touch area (S210). When the touch operation is started from the first touch area and ended in the second touch area, the protection layer is moved to reveal the original layer originally covered by the protection layer (S212), and the screen-locked state of the touch screen is to be unlocked (S214). For example, the protection layer is moved downwards into a lower edge of the touch screen to remove the protection layer.

Otherwise, when the touch operation is determined not started from the first touch area or not ended in the second touch area, the current moved protection layer is bounced back to its original position to re-cover the original layer again (S216).

According to the above method for unlocking the screen-locked state of the touch screen, the user can move the protection layer to view a content displayed on the original layer by touching and dragging the protection layer. In addition, the user can remove the protection layer to operate the electronic device by touching the touch screen from the first touch area to the second touch area to cross the separate line with finger or stylus.

Figure 3:
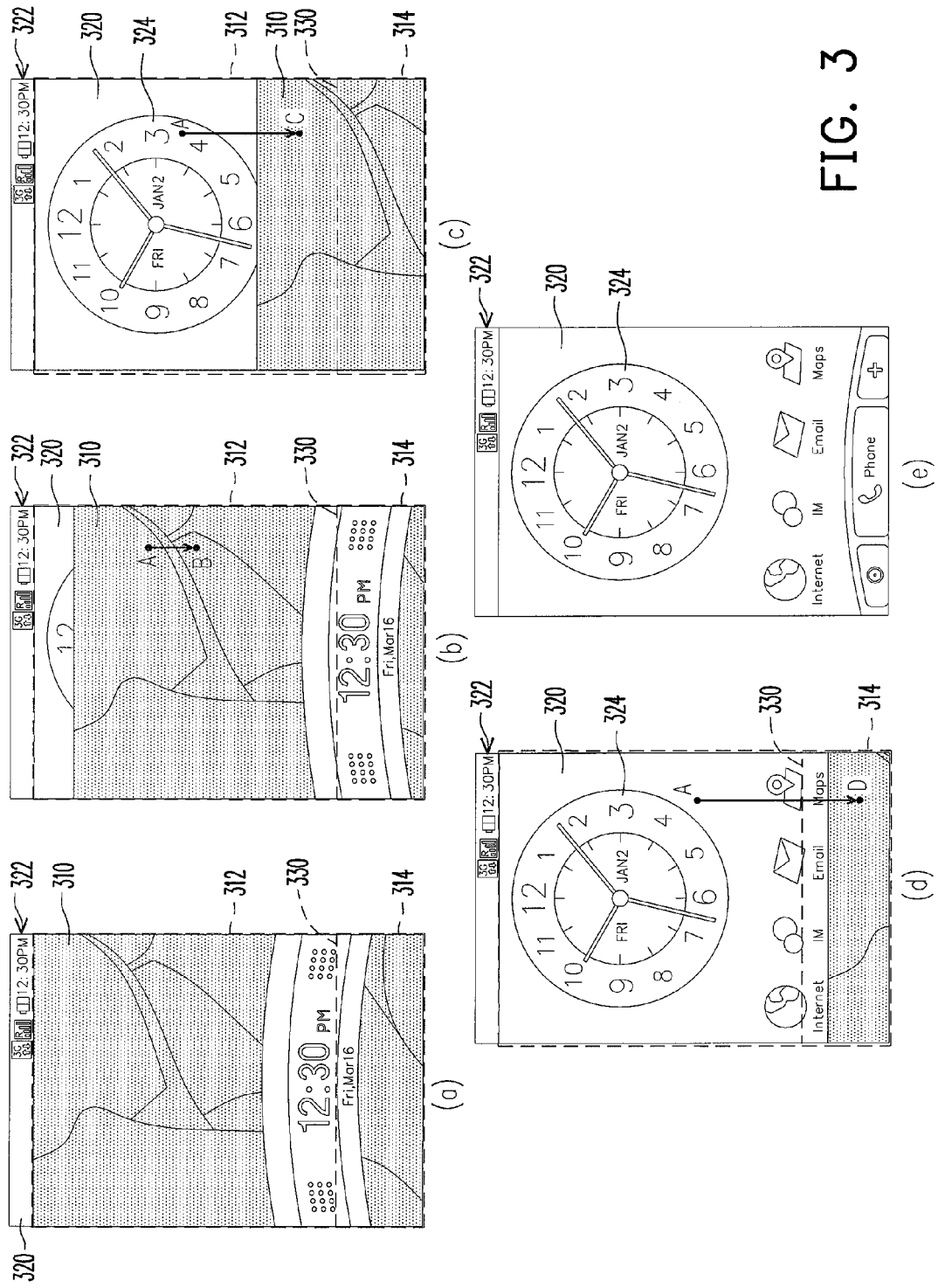
FIG. 3(a) to FIG. 3(e) are diagrams illustrating a method for unlocking a screen-locked state of a touch screen according to a first example of the present application.

For example, FIG. 3(a) to FIG. 3(e) are diagrams illustrating a method for unlocking a screen-locked state of a touch screen according to a first example of the present application. FIG. 3(a) illustrates a screen image of the electronic device while the touch screen is in the screen-locked state, wherein a protection layer 310 covers an original layer 320, and leaves a status bar 322 on the original layer 320 uncovered. Now, the user can see information such as time and date, etc. displayed on the status bar 322, but cannot see the content on the original layer 320 covered by the protection layer 310 to operate the electronic device.

It should be noticed that in the present example, a separate line 330 is used to divide the touch screen into a first touch area 312 and a second touch area 314 as a reference for determining whether to unlock the screen-locked state of the touch screen. Namely, when the user touches the touch screen moving from the first touch area 312 to the second touch area 314 across the separate line 330, the electronic device then removes the protection layer 310 to unlock the screen-locked state of the touch screen.

Referring to FIG. 3(b), when the user touches the touch screen moving from a point A to a point B, the electronic device correspondingly moves the protection layer 310 along a direction from point A to point B to reveal a part of the original layer 320 originally covered by the protection layer 310.

Referring to FIG. 3(c), when the user continually moves on the touch screen to a point C, the protection layer 310 is moved downwards accordingly and a clock 324 on the original layer 320 is to be shown to the user. If the user stops touching the touch screen at the point C, since the start point A and the end point C of the touch operation are all located within the first touch area 312 and the touch operation is not across the separate line 330, the protection layer 310 is bounced back to its original position as shown in FIG. 3(a) to re-cover the original layer 320, and the screen-locked state of the touch screen is not to be unlocked.

Referring to FIG. 3(d), if the user continually moves on the touch screen to a point D, the protection layer 310 is further moved downwards accordingly. If the user stops touching the touch screen at the point D, since the start point A of the touch operation is located in the first touch area 312 and the end point D of the touch operation is located in the second touch area 314, and the touch operation is across the separate line 330, the protection layer 310 is moved downwards into a lower edge of the touch screen, and the screen-locked state of the touch screen is to be unlocked. After that, the original layer 320 is totally displayed on the touch screen (shown as FIG. 3(e)) for allowing the user to perform general operations of the electronic device, for example, making a phone call, sending an E-mail or any other general operations of the mobile phone in this example.

As described above, if the touch operation is not started from the first touch area or not ended in the second touch area (i.e. not across the separate line), the screen-locked state of the touch screen is not to be unlocked.

Figure 4:
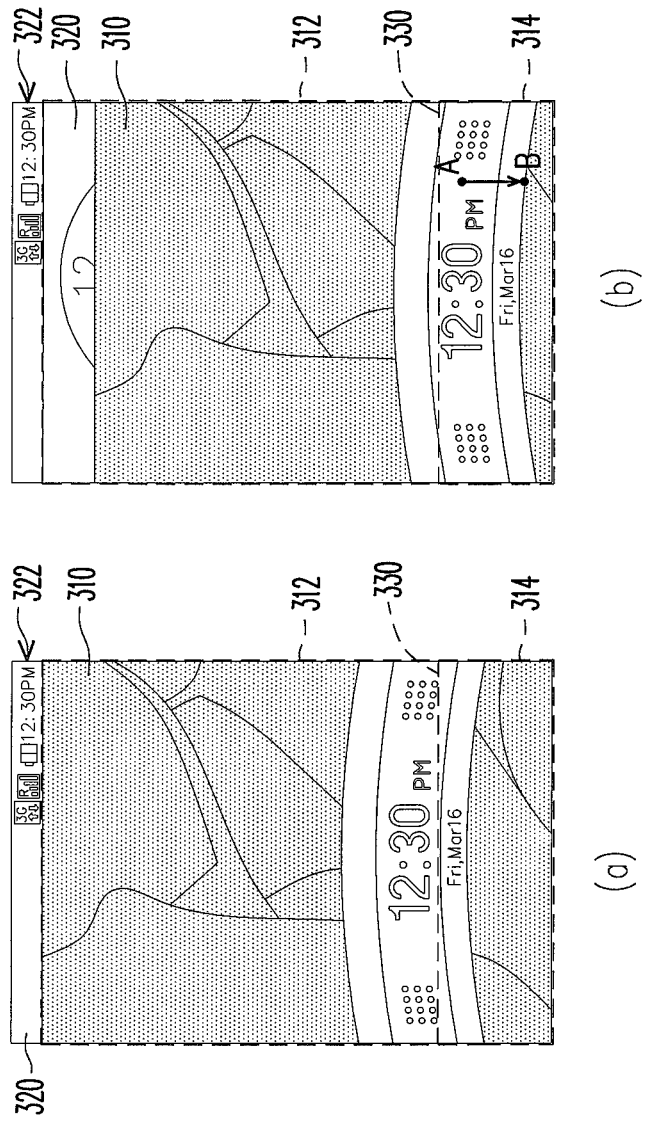
FIG. 4(a) and FIG. 4(b) are diagrams illustrating a method for unlocking a screen-locked state of a touch screen according to a second example of the present application.

For another example, FIG. 4(a) and FIG. 4(b) are diagrams illustrating a method for unlocking the screen-locked state of the touch screen according to a second example of the present application. FIG. 4(a) illustrates a screen image of the electronic device while the touch screen is in the screen-locked state, which is the same as FIG. 3(a).

Referring to FIG. 4(b), when the user touches the touch screen moving from a point A to a point B, the electronic device correspondingly moves the protection layer 310 along a direction from the point A to the point B to reveal a part of the original layer 320 originally covered by the protection layer 310. If the user stops touching the touch screen at the point B, since the start point A and the end point B of the touch operation are all located within the second touch area 314, and the touch operation is not across the separate line 330, the protection layer 310 is bounced back to its original position as that shown in FIG. 4(a) to re-cover the original layer 320, and the screen-locked state of the touch screen is not to be unlocked.

It should be noticed that in another example, when the displacement of the touch operation along the specific direction on the touch screen does not exceed a predetermined value, the protection layer 310 is not correspondingly moved.

Figure 5:
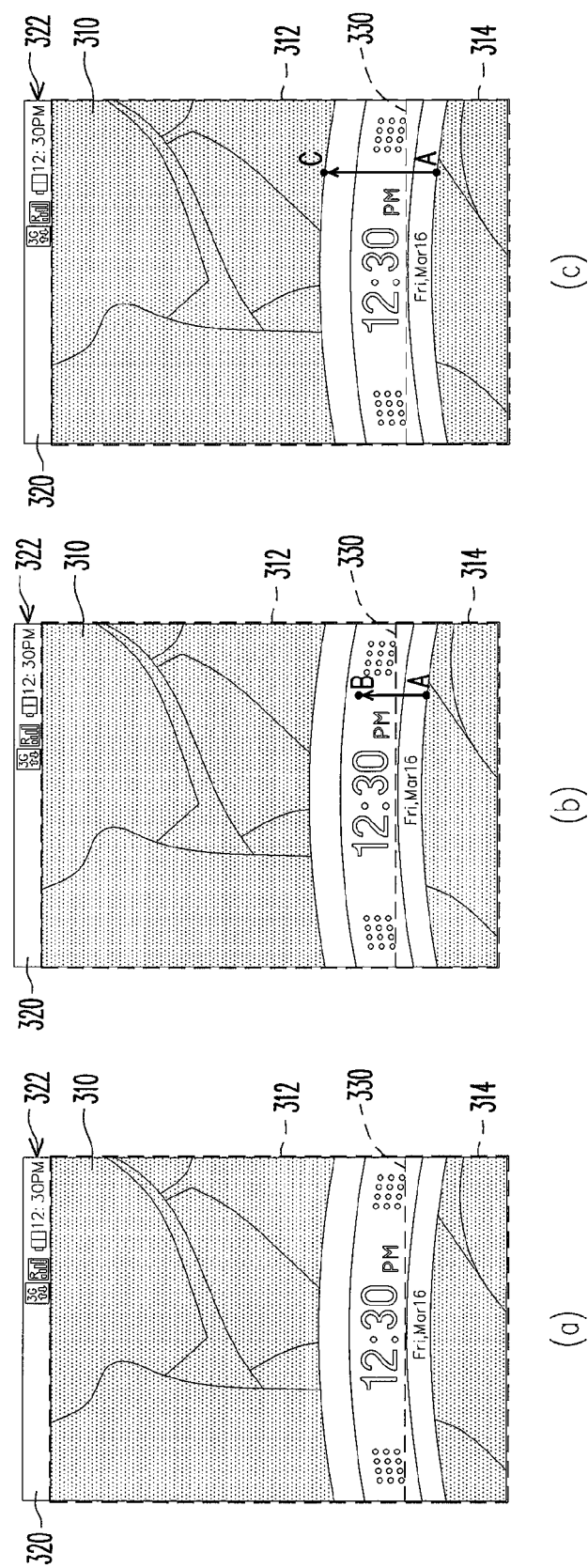
FIG. 5(a) to FIG. 5(c) are diagrams illustrating a method for unlocking a screen-locked state of a touch screen according to a third example of the present application.

For another example, FIG. 5(a) to FIG. 5(c) are diagrams illustrating a method for unlocking the screen-locked state of the touch screen according to a third example of the present application. FIG. 5(a) illustrates a screen image of the electronic device while the touch screen is in the screen-locked state, which is the same as FIG. 3(a).

Referring to FIG. 5(b), in the present example, the specific direction is set to be a downward direction, and the predetermined value is set to be zero. When the user touches the touch screen moving from a point A to a point B, since the touch operation does not have a downward displacement, the protection layer 310 is not moved. If the user stops touching the touch screen at the point B, since the start point A and the end point B of the touch operation are all located within the second touch area 314, and the touch operation is not across the separate line 330, the screen-locked state of the touch screen is not to be unlocked.

Referring to FIG. 5(c), if the user continually moving upwards on the touch screen to a point C, since the touch operation still does not have the downward displacement, the protection layer 310 is still not moved accordingly. If the user stops moving on the touch screen at the point C, though the touch operation crosses the separate line 330, since the start point A of the touch operation is not located in the first touch area 312, and the end point C is not located in the second touch area 314, the screen-locked state of the touch screen is not to be unlocked.

It should be noticed that in other examples, the electronic device can further define a specific area on the touch screen as a reference for determining whether to move the protection layer 310. In detail, even if the touch screen detects the touch operation, the protection layer is not moved when the touch operation is not moved in the specific area. However, once the touch operation is moved in the specific area, the electronic device then moves the protection layer according to the touch operation.

Figure 6:
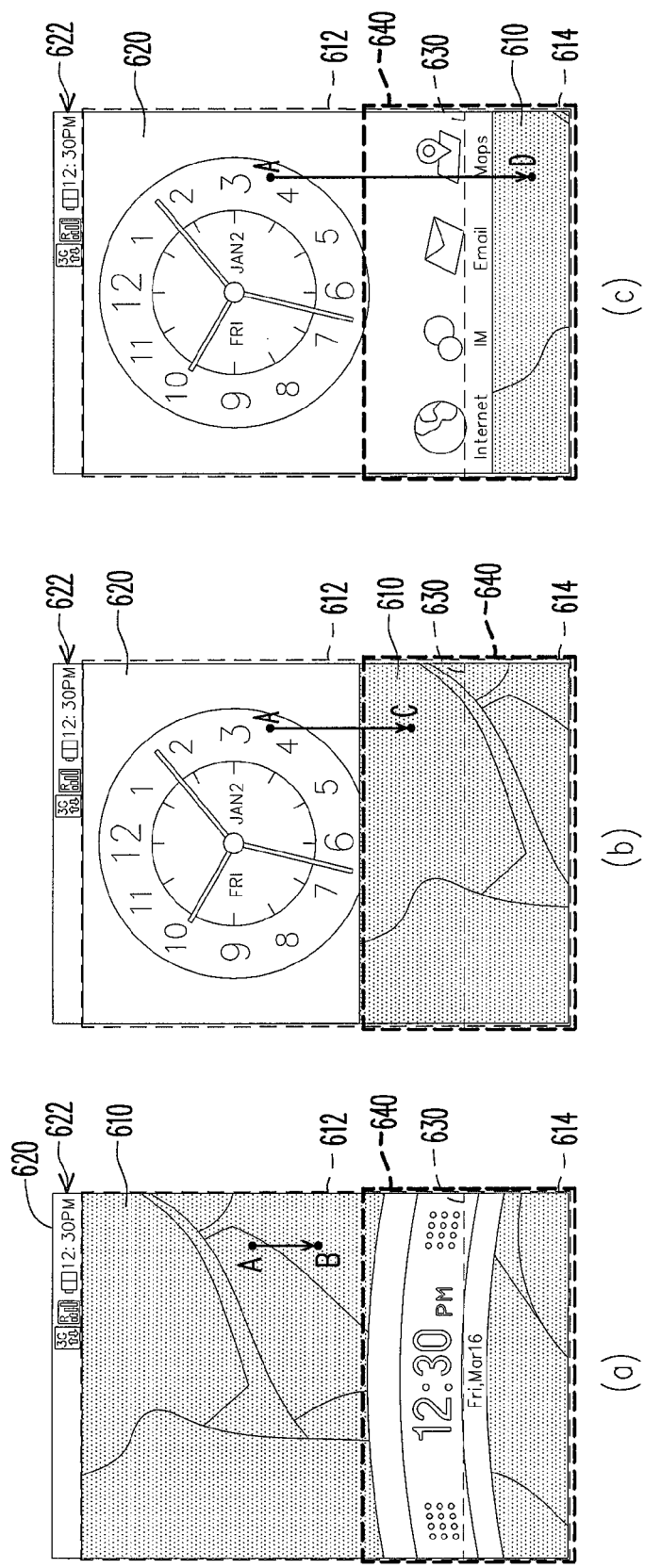
FIG. 6(a) to FIG. 6(c) are diagrams illustrating a method for unlocking a screen-locked state of a touch screen according to a forth example of the present application.

For example, FIG. 6(a) to FIG. 6(c) are diagrams illustrating a method for unlocking the screen according to a fourth example of the present application. FIG. 6(a) illustrates a screen image of the electronic device while the touch screen is in the screen-locked state, wherein a protection layer 610 covers an original layer 620, and leaves a status bar 622 above the original layer 620 uncovered.

In the present example, a separate line 630 is used to divide the protection layer 610 into a first touch area 612 and a second touch area 614 as a reference for determining whether to unlock the screen-locked state of the touch screen. The difference to the aforementioned example is a specific area 640 is further defined in the present example to serve as a reference for determining whether to move the protection layer 610.

Referring to FIG. 6(a), when the user touches the touch screen moving from a point A to a point B, the protection layer 610 is not to be moved because the touch operation is not moved in the specific area 640.

Referring to FIG. 6(b), when the user continually moves on the touch screen to a point C, the protection layer 610 is correspondingly moved downwards according to a movement of the touch operation in the specific area 640 because the touch operation is moved in the specific area 640, and then a part of the original layer 620 located under the protection layer 610 is to be revealed. If the user stops touching the touch screen at the point C, as described above, since the start point A and the end point C of the touch operation are all located within the first touch area 612 and the touch operation in not across the separate line 630, the protection layer 610 is bounced back to its original position as shown in FIG. 6(a) to re-cover the original layer 620, and the screen-locked state of the touch screen is not to be unlocked.

Referring to FIG. 6(c), if the user continually moves on the touch screen to a point D, the protection layer 610 is further moved downwards accordingly because the displacement of the touch operation within the specific area 640 is increased. If the user stops touching the touch screen at the point D, as described above, since the start point A is located in the first touch area 612 and the end point D is located in the second touch area 614, and the touch operation is across the separate line 630, the protection layer 610 is moved downwards into a lower edge of the touch screen and the screen-locked state of the touch screen is to be unlocked.

It should be noticed that in another example, the electronic device further displays a prompt message on the protection layer to prompt a latest untreated event to user. The untreated event may be a missed call, an unread voicemail, an unread message and/or an unread E-mail, which is not limited by the present application.

Figure 7:
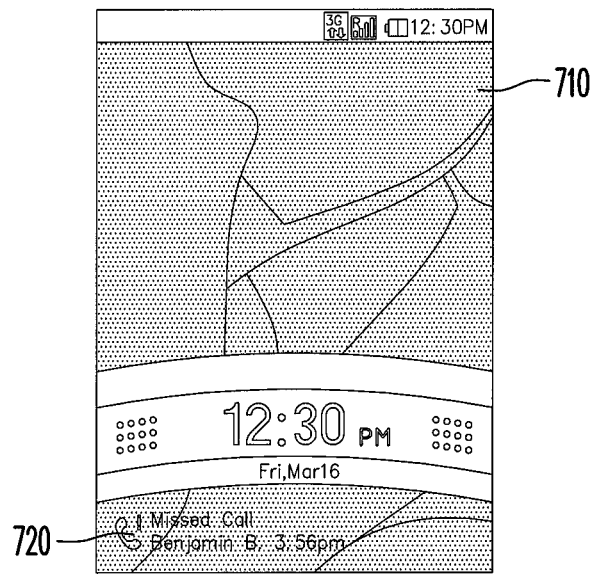
FIG. 7 is a diagram illustrating an example of a protection layer according to an example of the present application.

For example, FIG. 7 is a diagram illustrating an example of a protection layer according to an example of the present application. Referring to FIG. 7, besides displaying a current time and date, the protection layer 710 further displays a prompt message 720 of a missed call at a lower area of the protection layer 710 to prompt the user he/she missed a call.

In allusion to the aforementioned method for unlocking the screen-locked state of the touch screen, the present application also provides a corresponding hardware apparatus to apply the method to mobile phones, PDAs, PDA mobile phones, lap top computers, car computers, digital cameras, music players, game devices or any other electronic device with a touch screen etc. Another example is provided below for further description.

Figure 8:
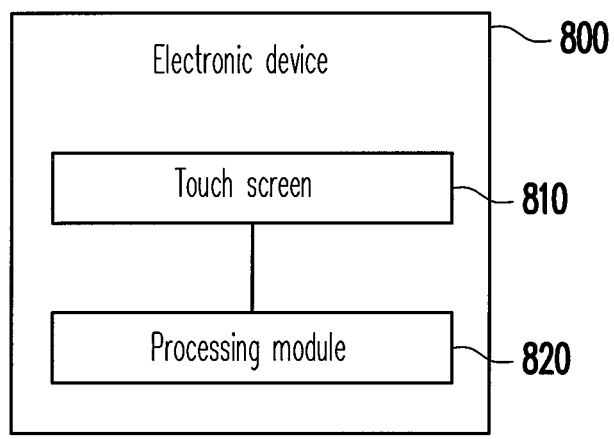
FIG. 8 is a block diagram of an electronic device according to an example of the present application.

FIG. 8 is a block diagram of an electronic device according to an example of the present application. Referring to FIG. 8, the electronic device 800 comprises a touch screen 810 and a processing module 820.

The touch screen 810 is used for detecting a touch operation to the electronic device 800 performed by the user. When the touch screen 810 is in the screen-locked state, the touch screen 810 defines an unlocking area, wherein the unlocking area is divided into a first touch area and a second touch area by a separate line.

The processing module 820 is coupled to the touch screen 810, which is used for determining whether to unlock the screen-locked state of the touch screen 810 according to the detected touch operation when the touch screen 810 is in the screen-locked state. If the processing module 820 determines that the touch operation is started from the first touch area and ended in the second touch area, the processing module 820 unlocks the screen-locked state of the touch screen 810, for allowing the user to operate the electronic device 800 with the touch screen 810.

It should be noticed that during a process that the touch screen detects the user's touch operation, the processing module 820 can show the original layer under the protection layer by moving or removing the protection layer and unlock the screen-locked state of the touch screen according to the touch operation detected by the touch screen 810. Since the related technique features have been described in the aforementioned examples, details thereof are omitted for brevity.

The present application further provides a recording medium for storing a computer program, which is used to execute the method for unlocking a screen-locked state of a touch screen. Basically, the computer program is assembled by a plurality of program sections (i.e. an organization diagram building program section, a list approving program section, a setting program section, and a deploying program section). Moreover, after the plurality of program sections are loaded to the electronic device and executed, the steps of the screen unlocking method can be accomplished.

In summary, according to the examples of the present application, when the touch screen of the electronic device enters the screen-locked state, an additional protection layer is to cover the original layer originally displayed on the touch screen for avoiding the user miss-touching the function icons or keys displayed on the original layer. Moreover, the user can move the protection layer by touching and moving on the touch screen to view the content displayed on the original layer. If the user wants to recover to a normal operation mode, the user can remove the protection layer by touching and sliding across the separate line to unlock the screen-locked stat of the touch screen.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for unlocking an electronic device, comprising:
    displaying a protection layer on the touch screen in the screen-locked state of the electronic device;
    detecting a touch operation with the touch screen;
    revealing an original layer visually covered by the protection layer by moving the entire protection layer according to the touch operation, wherein a spatial size of a revealed part of the original layer is positively correlated to a vertical moving distance of a top edge of the entire protection layer; and
    moving the entire protection layer until the entire original layer is displayed on the touch screen, wherein a relative position between the original layer and the touch screen is not changed during moving the entire protection layer, and the electronic device is unlocked after the entire original layer is displayed on the touch screen.

2. The method as claimed in claim 1, wherein the step of revealing the original layer visually covered by the protection layer by moving the entire protection layer according to the touch operation comprises:
moving the entire protection layer along a specific direction when a displacement of the touch operation along the specific direction is greater than a predetermined value.

3. The method as claimed in claim 2, wherein the step of revealing the original layer visually covered by the protection layer by moving the entire protection layer according to the touch operation further comprises:
determining a moving distance of the protection layer according to the displacement of the touch operation along the specific direction.

4. The method as claimed in claim 1, wherein the step of revealing the original layer visually covered by the protection layer by moving the entire protection layer according to the touch operation comprises:
moving the entire protection layer according to the touch operation only when the touch operation is moved within a specific area on the touch screen.

5. The method as claimed in claim 1, further comprising:
unlocking the electronic device when determining that the touch operation is started from a first touch area and ended in a second touch area; and
bouncing back the entire protection layer to its original position to re-cover the original layer when the touch operation is determined not started from the first touch area or not ended in the second touch area.

6. The method as claimed in claim 1, further comprising:
displaying a prompt message on the protection layer to prompt a latest untreated event.

7. The method as claimed in claim 6, wherein the untreated event comprises one of a missed call, an unread voicemail, an unread message and an unread E-mail.

8. An electronic device, comprising:
a touch screen, displaying a protection layer in a screen-locked state and detecting a touch operation; and
a processing module, coupled to the touch screen, for revealing an original layer visually covered by the protection layer by moving the entire protection layer according to the touch operation, wherein a spatial size of a revealed part of the original layer is positively correlated to a vertical moving distance of a top edge of the entire protection layer, and moving the entire protection layer until the entire original layer is displayed on the touch screen, wherein a relative position between the original layer and the touch screen is not changed during moving the entire protection layer, and the electronic device is unlocked after the entire original layer is displayed on the touch screen.

9. The electronic device as claimed in claim 8, wherein the processing module further moves the entire protection layer along a specific direction when a displacement of the touch operation along the specific direction is greater than a predetermined value.

10. The electronic device as claimed in claim 9, wherein the processing module further determines a moving distance of the protection layer according to the displacement of the touch operation along the specific direction.

11. The electronic device as claimed in claim 8, wherein the touch screen further has a specific area, and the processing module further moves the entire protection layer according to the touch operation only when the touch operation is moved within the specific area on the touch screen.

12. The electronic device as claimed in claim 8, wherein the processing module further unlocks the electronic device when determining that the touch operation is started from a first touch area and ended in a second touch area,
the processing module further bounces back the entire protection layer to its original position to re-cover the original layer when determining that the touch operation is not started from the first touch area or not ended in the second touch area.

13. The electronic device as claimed in claim 8, wherein the touch screen displays a prompt message on the protection layer to prompt a latest untreated event.

14. The electronic device as claimed in claim 13, wherein the untreated event comprises one of a missed call, an unread voicemail, an unread message and an unread E-mail.

15. A non-transitory computer readable recording medium used for storing a computer program, said computer program comprising a plurality of codes used for being loaded into an electronic device and enabling the electronic device to execute the following steps:
displaying a protection layer on the touch screen in the screen-locked state of the electronic device;
detecting a touch operation with the touch screen;
revealing an original layer visually covered by the protection layer by moving the entire protection layer according to the touch operation, wherein a spatial size of a revealed part of the original layer is positively correlated to a vertical moving distance of a top edge of the entire protection layer; and
moving the entire protection layer until the entire original layer is displayed on the touch screen, wherein a relative position between the original layer and the touch screen is not changed during moving the entire protection layer, and the electronic device is unlocked after the entire original layer is displayed on the touch screen.

16. An electronic device, comprising:
a touch screen, displaying a protection layer in a screen-locked state;
a detecting means for detecting a touch operation with the touch screen;
a moving means for revealing an original layer visually covered by the protection layer by moving the entire protection layer according to the touch operation, wherein a spatial size of a revealed part of the original layer is positively correlated to a vertical moving distance of a top edge of the entire protection layer; and
an unlocking means for moving the entire protection layer until the entire original layer is displayed on the touch screen, wherein a relative position between the original layer and the touch screen is not changed during moving the entire protection layer, and the electronic device is unlocked after the entire original layer is displayed on the touch screen.

* * * * *